United States Patent [19]

Mahoney

[11] Patent Number: 4,986,223
[45] Date of Patent: Jan. 22, 1991

[54] INTERNAL COMBUSTION ENGINE INJECTION SUPERHEATED STEAM

[76] Inventor: Fred G. Mahoney, 505 Dorseyville Rd., Pittsburgh, Pa. 15238

[21] Appl. No.: 283,547

[22] Filed: Dec. 12, 1988

[51] Int. Cl.⁵ .............................................. F02D 19/00
[52] U.S. Cl. ................................. 123/25 B; 123/25 P
[58] Field of Search .................. 123/25 B, 25 P, 25 D

[56] References Cited

U.S. PATENT DOCUMENTS

| | | | |
|---|---|---|---|
| 3,665,897 | 5/1972 | Boyer | 183/25 B |
| 3,980,055 | 9/1976 | Webb | 123/25 B |
| 3,996,902 | 12/1976 | Ri et al. | 123/25 B |
| 4,114,566 | 9/1978 | Harpman et al. | 123/25 B |
| 4,122,803 | 10/1978 | Miller | 123/25 P |
| 4,409,931 | 12/1983 | Lindberg | 123/25 P |
| 4,515,135 | 5/1985 | Glass | 123/25 B |
| 4,519,341 | 5/1985 | McGarr | 123/25 B |
| 4,594,991 | 6/1986 | Harvey | 123/25 B |
| 4,637,352 | 1/1987 | Green | 123/25 D |
| 4,779,576 | 10/1988 | Bidwell | 123/25 P |

*Primary Examiner*—E. Rollins Cross
*Attorney, Agent, or Firm*—Trask, Britt & Rossa

[57] ABSTRACT

A method and apparatus for superheating steam and for injection of same into the air supply of an internal combustion engine are disclosed. A disc-shaped heat exchanger in direct contact with hot exhaust gases is utilized to vaporize and superheat a liquid, particularly water, into superheated steam.

15 Claims, 1 Drawing Sheet

INTERNAL COMBUSTION ENGINE INJECTION SUPERHEATED STEAM

BACKGROUND OF THE INVENTION

1. Field

The present invention relates to apparatus and method for injecting a vapor into an internal combustion engine and particularly to systems and apparatus for injecting vapor into the carburetor of a gasoline engine.

2. Prior Art

Injection of water vapor into the carburetor of an internal combustion engine has been generally acknowledged to improve the efficiency and performance of the engine. It has also been utilized as an aid to acceleration.

U.S. Pat. No. 4,027,630 of Giardini, et al. discloses an apparatus and system which is structured to feed a mixture of water vapor and alcohol to an internal combustion engine upon demand caused by acceleration of the engine.

Another device for elevating the humidity of the air supply to an internal combustion engine is illustrated and described in U.S. Pat. No. 4,557,222 of Nelson. Air is pumped through water-saturated porous media prior to introduction to the engine.

SUMMARY OF INVENTION

A method and apparatus for introducing superheated steam into the air induction system of an internal combustion engine has been invented. Although the superheated steam is usually superheated water vapor, other liquids such as gasoline, gasohol, alcohol and the like may be readily evaporated and superheated by use of the method and apparatus of the instant invention.

However, because of the effectiveness of superheated steam as an injectable vapor, the inclusion of other materials, such as alcohol or gasoline in such superheated vapor, is generally not necessary to achieve outstanding improvement in engine efficiency and performance. Also, because of the substantially even distribution of superheated steam within the air stream and because of the effectiveness of superheated steam in comparison with water droplets, less superheated steam may be utilized in comparison to other water-vapor injection systems without any loss in performance.

A liquid, such as water, is introduced into a compact heat exchanger located adjacent to the exhaust manifold. The location and structure of the heat exchanger of this invention are such that very hot exhaust gases, which are at a temperature approximating the maximum temperature of combustion, flow in direct contact with portions of the heat exchanger. Thus, the heat exchange process involves heat transfer directly from the very hot exhaust gases to the metal exchanger to the liquid within the exchanger. Thus, the exchanger is located directly in the hot exhaust flow and as close to the exhaust ports of the combustion cylinders as possible.

DESCRIPTION OF THE INVENTION

Figure 1:
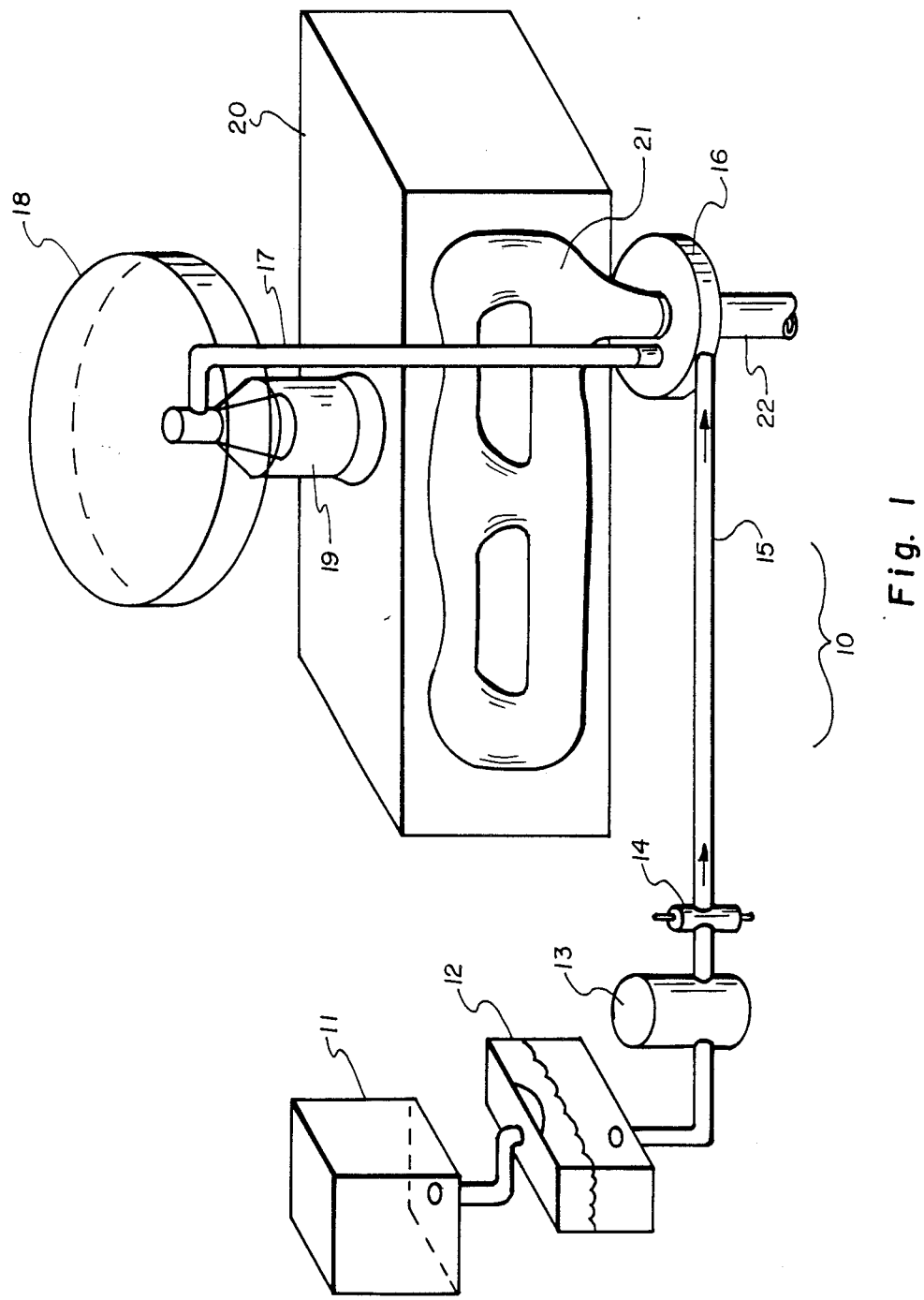
FIG. 1 is a schematic representation of a superheated steam supply system for an internal combustion engine.

The instant invention relates to a system and method for introducing superheated steam into the carburetor or air stream of an internal combustion engine or fuel injection system. The invention further involves an apparatus for such purposes which may be readily retrofitted on most internal combustion engines, particularly automobile engines. The system works effectively with either carbureted or fuel-injected engines.

The system and apparatus of the instant invention include a remote water reservoir tank, an intermediate feed tank equipped with a level control means, a solenoid valve, a metering valve, and a heat exchanger adaptable to the exhaust manifold of an internal combustion engine so that the exchanger is in direct contact with hot exhaust gases, an inlet line connecting the feed tank, the solenoid valve, the metering valve and the heat exchanger and a discharge line from the heat exchanger to the induction system of the engine.

Conduit means supplies water or other liquids through a solenoid valve means and through metering valve means, which may be responsive to the speed or the acceleration of the vehicle, to a heat exchange means to superheat the liquid water into superheated steam. Conduit means is further provided to convey the superheated steam from the heat exchanger into the carburetor of a vehicle. Also, the system may be equipped with a temperature sensing means interacting with a solenoid valve to sense the temperature of the heat exchanger so that the system will not begin operating until the heat exchanger has reached an operable temperature, for example, above about 500° F. and especially above about 700° F. or even above about 1000° F.

A particularly unique feature of the instant invention comprises a heat exchanger which is formed of two or more discs placed together in sandwich style to form a circular, disc-like heat exchanger which generally has a thickness of about two inches or less and, generally, is about one inch or less in thickness. Such a disc-like exchanger has a diameter generally of about eight inches or less and preferably about six inches or less and maybe as small as about three inches in diameter depending upon the size of the engine involved.

Because of its flat, compact, disc-like structure, this heat exchanger may be placed between the outlet flange of the exhaust manifold and the inlet flange of the exhaust pipe. To install such a heat exchanger in an existing engine, the flanges of the exhaust manifold and the exhaust pipe are separated from one another, the heat exchanger is placed between the flanges and the system is bolted together again. Generally, no modification to the exhaust system or to the exhaust manifold is required.

Because of its small dimensions, the heat exchanger may be thoroughly insulated so that the temperatures necessary to superheat the steam may be reached in the exchanger. If the heat exchanger tends to be very large, insufficient room for insulation exists so that the desired operating temperatures may not be achievable for the desired water flow rate. Thus, the compact, disc-like exchanger which is in direct contact with hot exhaust gases flame is very effective for the purposes of this invention.

Further description of the invention may be facilitated by reference to the attached drawings. In FIG. 1, a reserve water tank 11 which has a reservoir for water is illustrated. Water flows from the reserve water tank 11 into the feed water tank 12. A float valve or other control means control the level of water within the water feed tank. A solenoid valve 13 acting as an on/off valve may be interconnected with an electrical switch as a heat exchanger temperature sensor, such as the vehicle ignition switch or a separate electrical switch, so the operator of the vehicle may wait until the temperature of the automobile is at an operating temperature before switching on the superheated steam injection system. A metering valve 14 is downstream from the solenoid valve. The metering valve may be a fixed orifice or it may be an adjustable orifice which is manually adjusted or which is adjusted by the manifold pressure of the engine, so that the water flow is proportional to engine speeds, i.e. to engine revolutions per minute (rpms). The water flows through an inlet pipe 15 into a heat exchanger 16. Superheated steam flows through pipe 17 into the air filter 18 of the vehicle engine carburetor 19 to be admixed with air and fuel for introduction to the engine 20.

Figure 2:
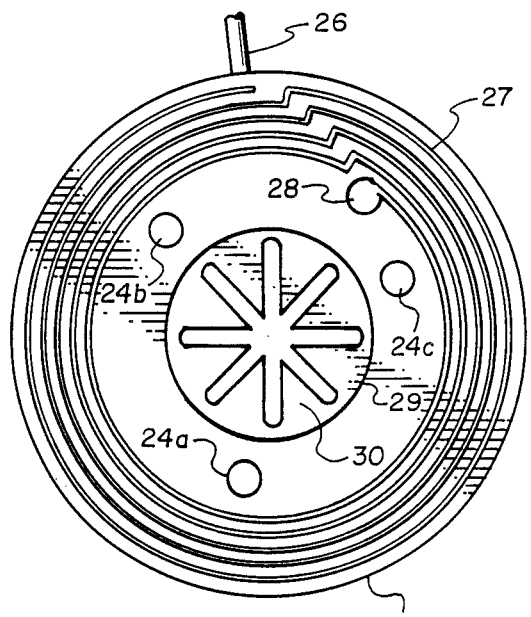
FIG. 2 is a plan view of an exposed element of a disc-like heat exchanger device such as that illustrated in FIG. 3.
Figure 3:
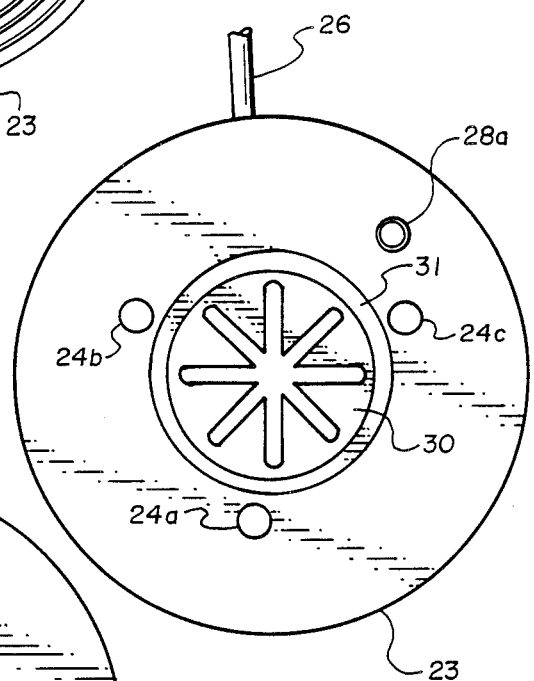
FIG. 3 is an external plan view of the top of a disc-like heat exchanger device.
Figure 4:
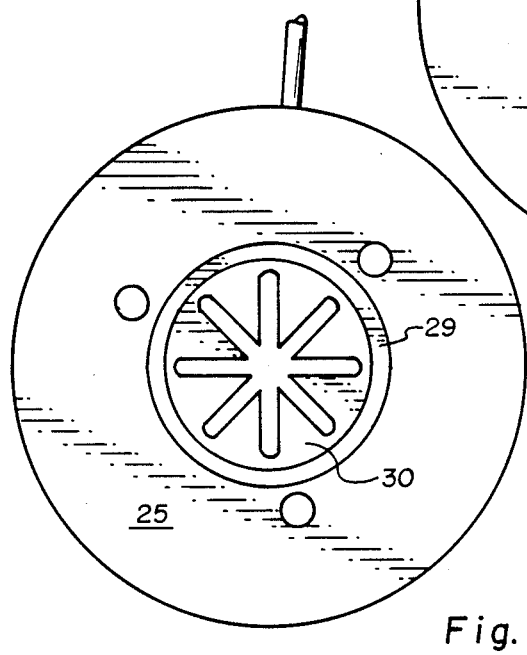
FIG. 4 is an external plan view of the bottom of a disc-like heat exchanger device.

In FIGS. 2, 3, and 4 there is illustrated a heat exchanger especially effective for the purposes of this invention. As indicated hereinabove, the heat exchanger is formed in two, three or more disc-like components. Disc-like component 23 is a relatively thin, e.g. about one-quarter to one inch, substantially flat member which has a spiral of grooves 27 therein to carry the liquid water until it vaporizes and becomes superheated. An inlet pipe 26 is illustrated which introduces water from the main water pipe 15. The water is introduced into the grooves 27 and exit through exit port 28. Vanes 30 protrude into the exhaust chamber, which is formed by the sidewall of the discs surrounding the central opening in each disc. Exhaust flows around and over the vanes on the way from the exhaust manifold to the exhaust pipe.

A top view of the heat exchanger is illustrated in FIG. 3 and a bottom view is illustrated in FIG. 4. The reverse side of component 24 is illustrated in FIG. 4. Outlet pipe 28a is positioned substantially perpendicular to the bottom surface of component 23. Bolt holes 24a, 24b and 24c are illustrated. These bolt holes are used to bolt the heat exchanger to the respective flanges of the exhaust manifold and exhaust pipe.

In FIG. 4 the heat exchanger is illustrated with disc-like member 25 (see FIG. 5) secured to component 23 to form the heat exchanger. The two parts (23 and 25) may be welded together to form an integral unit. Grooves 29 and 31 are made with ridges on the exhaust manifold and exhaust pipe flanges so that a tight fit is obtained to provide a leak-proof chamber in which vanes 30 are enclosed.

Figure 5:
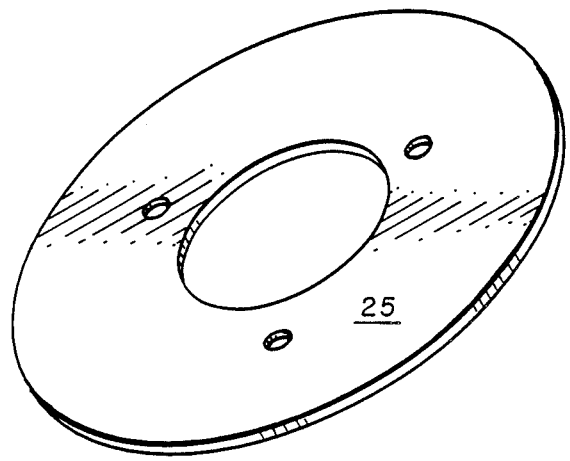
FIG. 5 is a perspective view of a ring-like plate which combines with the element of FIG. 2 to form a device such as that illustrated in FIG. 2.

In FIG. 5 a flat disc-like annular member 25 having central aperture is illustrated. This member may also be about one-fourth to one inch in thickness although the thickness usually does not exceed about one-half inch.

Figure 6:
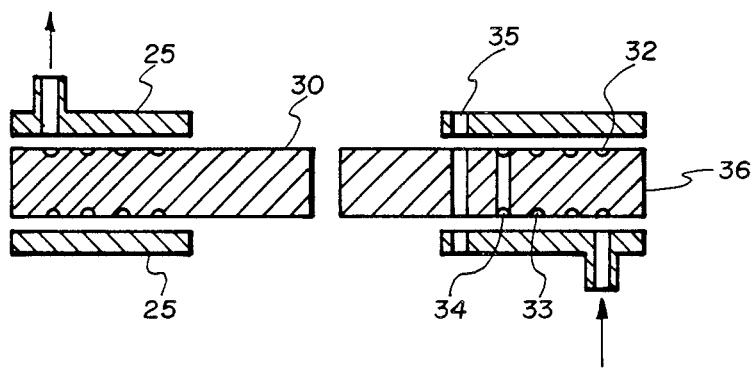
FIG. 6 is a cross-sectional view of a disc-like, dual-pass, three element heat exchanger.

A pair of annular members 25, fitted with appropriate inlet and outlet pipes, may be used in conjunction with a central disc-like member 36 having grooves on both flat opposed surfaces to form a three component heat exchanger. The residence time and length of travel in such a heat exchanger as that illustrated in FIG. 6 may be doubled over that available in a two-element heat exchanger of essentially the same size. The grooves 32 on one surface are connected with the grooves 33 on the opposite surface by a via or port 34. Bolt hole 35 is illustrated although the unit may be welded together to insure a gas-tight seal. Bolt hole 35 accommodates a bolt securing the heat exchanger to the appropriate flanges. (Usually at least three bolts are used for this purpose).

The invention provides a method of superheating steam for introduction into the air intake system of an internal combustion engine or fuel injection. It comprises a metering step for metering a liquid water stream at a controlled flow rate into a heat exchanger sized to vaporize and superheat sufficient water to supply the engine with an appropriate amount at an optimum operating speed which may not necessarily be the maximum speed of the engine. The heat exchanger is interconnected to the exhaust manifold of the internal combustion engine, preferably as close to the combustion chambers as possible so that the exhaust gas at its hottest temperature comes in direct contact with the heat exchanger, i.e. flows through the exchanger. For the purposes of this invention, the heat exchanger preferably is not merely attached around the manifold or the exhaust pipe, which is not generally a thermally efficient way to extract heat from a hot exhaust gas stream.

The liquid water within the exchanger is then heated to a temperature significantly above the boiling point of water at the pressures involved in the heat exchanger. The water is maintained within the heat exchanger for a sufficient amount of time to be vaporized and heated to a superheated condition. The superheated steam is then conveyed from the heat exchanger to the carburetor of an internal combustion engine or directly into the ports of a fuel injection engine.

Generally, it is desired to size the heat exchanger such that temperatures in the range of at least 500° F. up to about 1500° F. may be achieved within the heat exchanger. Preferably, the superheated steam is at a temperature of at least about 700° F. Exhaust gas exiting the combustion chambers of a conventional automobile internal combustion engine generally is within a temperature range of about 800° to about 1600° F. during normal operating temperatures for the engine. The small size of the heat exchanger is very important inasmuch as the desired temperatures may be most effectively achieved by insulating the heat exchanger so that radiation and convection heat losses do not lower the temperature of the heat exchanger below the desired operating conditions.

The heat exchanger is preferably made of copper or naval bronze to provide excellent thermal conductivity and corrosion resistance. Also, these materials will successfully withstand the temperatures required in the heat exchanger and any attendant pressure build up. Also, these materials have good corrosion resistance and will not be readily corroded by the exhaust gases or by the water.

The disc-like segmented structure of the heat exchanger is very desirable inasmuch as the heat exchanger may be readily dismantled for cleaning periodically if the water used in the system is very hard water. In this regard, it's generally preferred to use insulation which is formed such that it may be snapped together to be readily removable so that the heat exchanger can be dismantled easily to facilitate cleaning.

The instant system was fixed to a vehicle and was successfully operated. Introduction of superheated steam into the engine gave improved engine performance. Upon examination of the engine, it was found that the engine had been running cleanly, that is, there had been less carbon build up on spark plugs, valves, valve seats and the like than typically occurs in a normal automobile engine. Also, it was observed that the system could be effectively operated by introduction of a few percent of water in relation to the gasoline up to a fifty/fifty water (superheated steam)/gasoline condition. Furthermore, it was observed that on an older engine which had had a severe knock prior to installation of the system, once superheated steam was injected the knock of the engine was eliminated.

Although humid air has been provided by various types of devices to automobile engines, the instant invention involves a method and apparatus which is particularly effective for this purpose. In contrast to a system which directs the total air stream through a large humidifier, the instant invention is compact and easily fitted to an existing internal combustion engine. The water reservoir and feed tanks may be remotely located and need not be in the engine compartment, thus providing a system in which only a few small components need to be in the engine compartment.

An advantage of superheated steam for humidifying purposes appears to reside in the fairly uniform dispersion of the superheated water vapor within the air stream. Though water and gasoline do not mix in a liquid state except in vapors or superheated steam, both water and gasoline mix well together.

One explanation of the effect in an internal combustion engine of moisture injection is that the burn rate of the fuel is caused to be more uniform. If the moisture is present as nonuniformly dispersed droplets in the air stream, then the beneficial effect on the burn rate is not as great. A uniform burn rate is generally equated to improved engine efficiency, e.g. either an increase in power or fuel economy, or both.

In the instant invention, superheated steam, as a gas, would be expected to disperse rapidly and uniformly within the air stream. Thus, the water present is generally present as a gas (steam), as opposed to minute water droplets, uniformly dispersed within the air supply. While water gas distribution within the air stream resulting from superheated steam injection has not been measured to determine uniformity of distribution, the beneficial effects of such injection have resulted in improved engine performance by way of improved fuel economy and reducing knocking.

Figure 7:
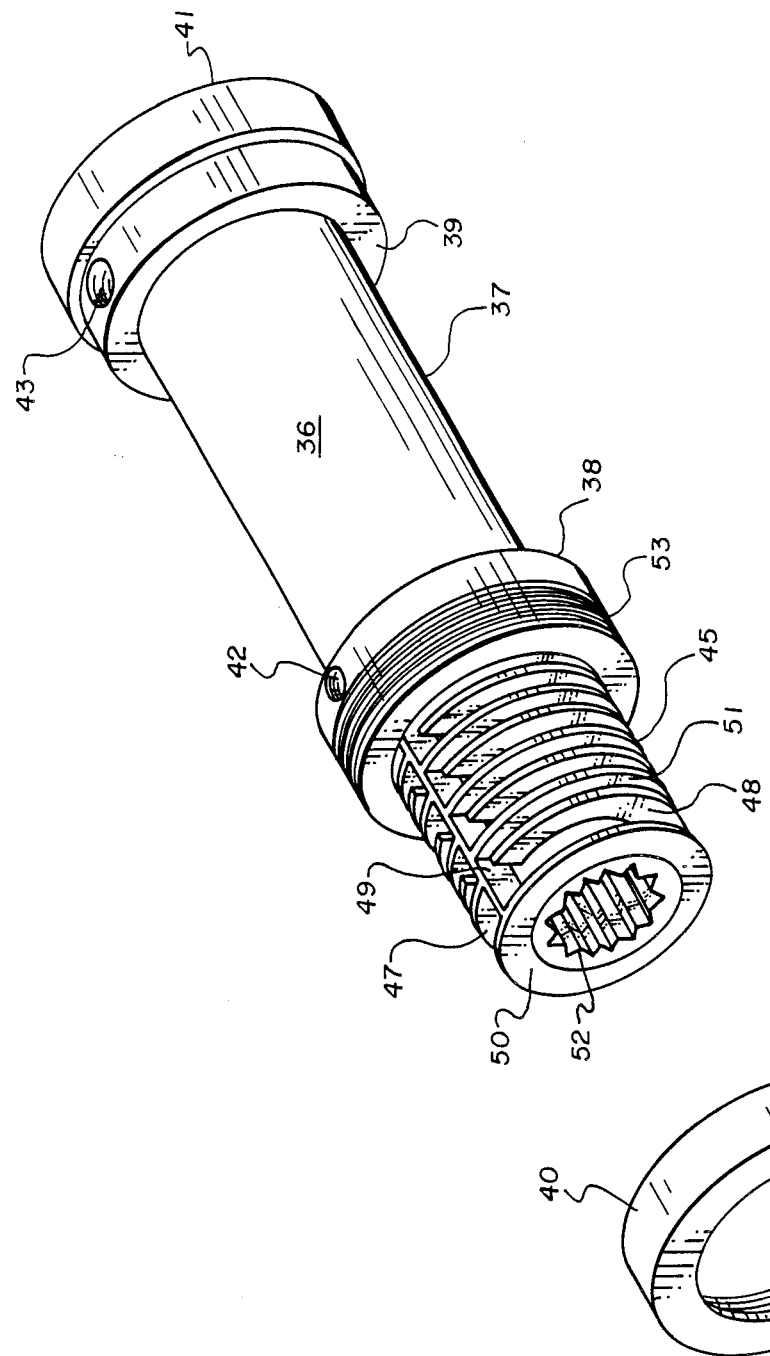
FIG. 7 is an exploded, perspective view of a cylindrical heat exchanger having an extended internal surface and a tortuous path external surface.

In FIG. 7 another embodiment of the invention is illustrated. In this view, a cylindrical or barrel-shaped heat exchanger is illustrated. The heat exchanger comprises an external shell 36 which must have sufficient thickness and strength to contain superheated steam up to a temperature of about 500° F. The external shell comprises a central barrel 37 and a pair of end flanges 38 and 39 which are each threaded on their outboard external surfaces to accept a pair of end caps 40 and 41.

The flanges also preferably have an inlet opening 42 in flange 38 and an outlet opening 43 in flange 39 which are generally threaded radial bores which communicate with the internal surface of the shell. These inlet and outlet openings are to convey water to the internal surface of the shell and to convey steam through the outlet opening away from the heat exchanger.

A central heat exchange element 45 has a elongated cylindrical shape where in the external surface of the heat exchange element 45 fits snugly into the internal cylindrical surface of the shell 36. The internal geometry of the shell and the external geometry of the central heat exchange element are preferably right cylinders. The external surface of the heat exchange element 45 has a continuous serpentine path formed by parallel, stacked, spaced rings 47 affixed to its external surface. Such rings have a circumference slightly less than the external circumference of the heat exchange 45 although the internal diameter of the rings and outer diameter of the heat exchanger element are the same. These rings 48 are attached to a central fin or spine 49 which runs the length of the heat exchanger and forms an anchor for the rings. Each ring is attached to the central fin 49 with the alternating ends of successive rings having their opposed end attached to the ring so that water, entering space between the outboard ring 50 which is a complete circular ring and the next ring identified as ring 48 in the drawing, will pass between the open end of ring 48 and fin 49 to pass into the next channel between successive rings. Since the next ring 50 has its end which is adjacent the free end of ring 48 attached to fin 49, the water must travel then circumferentially around the heat exchange element to then pass through the opening formed between the free end of ring 50 and the fin 49. Thus the water or other fluid entering through inlet 42 must pass in an serpentine fashion the length of the internal heat exchange element.

The rings or ring segments are incomplete circular members similar to piston rings, i.e. a small gap exists in the ring segment thus making the rings discontinuous members. The gap in a ring member permits fluid to flow from one side of the ring to its other side. The said ring members are continuous, i.e. these form a full 360° circle.

The gaps in adjacent rings may be alternated such that the gaps in adjacent rings are rotated 180° from one another. Such arrangement, when not used in conjunction with a spine element, still provides a serpentine course. The interior surface of the heat exchange element is formed as a series of internal longitudinal fins 52 which are triangular in cross section and run the length of the internal surface of the heat exchange element. The internal surface of the heat exchange element is intended to be contacted by hot exhaust gases. Other types of fins or structure for extending the internal surface of the heat exchanger in contact with exhaust gases may be utilized.

The end cap 40 as well as end cap 41 must form a seal against the outboard end surfaces of ring 50 to preclude the water entering into the channel or pathway existing in the outer surface of the heat exchange element 45 from mixing with the exhaust gases passing through the internal opening or bore of the heat exchange element. Also, end cap 40 must be threaded sufficiently and securely to flange 38 to prevent the fluid from escaping along the threaded surface 53 of the end flange.

The serpentine flow which must be traveled by liquid, generally water, entering inlet 42 involves a number of changes of direction and the associated turbulence of flow that is occasioned by such change in direction. Turbulent flow generally produces a better exchange of heat between a liquid and a solid surface so that not only does the serpentine flow result in the liquid, of necessity, contacting substantially the complete surface of the heat exchange element, it further introduces an additional degree of turbulence in the water flow.

The cylindrical heat exchanger illustrated in FIG. 7 may be quite effective in producing superheated steam for an internal combustion engine wherein the heat exchanger is from about four to ten inches in length with an internal diameter of the shell of about two to four inches. The internal bore of the heat exchange element 45 may be from about one to three inches. Generally, the height of the ring or spacing elements 48 may be from about ⅛ inch to ½ inch. As can be appreciated, the internal surface of the shell 37 should snugly contact the outer perimeter of the individual rings and the longitudinal fins so that the passageway between adjacent rings is confined.

I claim:

1. A method for introducing water vapor to the combustion chambers of an internal combustion engine comprising:
    introducing a metered amount of liquid water into a heat exchanger;
    contacting said heat exchanger directly with hot exhaust gases emanating from the exhaust manifold;
    maintaining said water in said heat exchanger for a period sufficient to vaporize said water into steam and superheat same;
    reducing pressure and increasing temperature to create superheated steam;
    introducing said superheated steam into the air supply proximate to the air induction system, upstream of any carburetion, of said internal combustion engine.

2. The method of claim 1 wherein said steam is superheated within said heat exchanger to a temperature of at least about 500° F.

3. The method of claim 1 wherein said superheated steam is introduced into the air stream providing oxygen to an internal combustion engine.

4. The method of claim 1 wherein said water is introduced to said heat exchanger in a continuous flow.

5. The method of claim 1 wherein said water flow within said heat exchanger is substantially cross-current to said exhaust gas flow.

6. The method of claim 1 wherein said water flow within said heat exchanger is substantially counter-current of said exhaust flow.

7. The method of claim 1 wherein said hot exhaust gas is at a temperature in excess of about 800° F.

8. A method for introducing water vapor into the air intake system of an internal combustion engine comprising:
    metering a liquid water stream into a heat exchanger interconnected to the exhaust system of an internal combustion engine;
    heating said heat exchanger to a temperature significantly above the boiling point of water;
    contacting said heat exchanger containing said liquid water stream for a period of time sufficient to vaporize said liquid water stream and to superheat said water vapors;
    conveying said superheated water vapors from said heat exchanger;
    introducing said superheated water vapors into the air intake system of an internal combustion engine.

9. Apparatus for providing superheated steam to the air intake system of an internal combustion engine comprising:
    water supply means for supplying liquid water flow to a metering device;
    water metering means connected to said water supply means for metering liquid water flow to a heat exchanger device;
    heat exchanger means, said heat exchanger means adapted to interact with the exhaust system of said internal combustion engine in a manner such that the heat exchanger means is heated by heat from the engine exhaust to temperatures significantly above the boiling point of water;
    channel means with inlet and exit means within said heat exchanger means through which said liquid water stream flows, said channel means having sufficient length and surface areas such that said liquid water flowing therethrough may be vaporized and superheated;
    restriction means to cause pressure losses along the channel means facilitating superheating;
    temperature sensing means to feed back the temperature of the heat exchanger to the water metering means, ensuring superheat;
    conduit means connected to said heat exchanger means for conveying said superheated steam exiting said heat exchanger to the air intake system of said internal combustion engine proximate to the air intake manifold.

10. The method of claim 1 wherein the water vapor flows through a heat exchanger path adapted to reduce pressure while increasing temperature of the vapor to facilitate superheating.

11. The method of claim 1 wherein the heat exchanger's temperature is sensed and fed back to the water flow control.

12. The apparatus of claim 9 wherein the temperature sensing means is at least one thermocouple in the heat exchanger means.

13. The apparatus in claim 9 wherein the temperature sensing means comprises multiple thermocouples which verify the state of the fluid.

14. The apparatus of claim 9 wherein the restriction means in the heat exchanger is structured to cause pressure losses along the flow path to facilitate superheat.

15. The apparatus of claim 14 wherein the flow restriction comprises turns and passages in the flow path's serpentine configuration.

* * * * *